United States Patent [19]
Nordberg et al.

[11] 4,025,150
[45] May 24, 1977

[54] EQUIPMENT HOUSING FOR COMMUNICATION SYSTEM

[75] Inventors: Svein T. Nordberg, El Paso, Tex.; Donald R. Shaner, Thousand Oaks, Calif.

[73] Assignee: GTE Sylvania Incorporated, Stamford, Conn.

[22] Filed: Dec. 12, 1975

[21] Appl. No.: 640,020

[52] U.S. Cl. .................. 339/177 R; 339/272 R
[51] Int. Cl.² ................................. H01R 7/12
[58] Field of Search ....... 339/122 R, 177 R, 177 E, 339/272 R, 272 A; 333/6

[56] References Cited
UNITED STATES PATENTS

| 3,374,456 | 3/1968 | Evans | 339/272 R |
| 3,629,806 | 12/1971 | Wiechmann | 339/272 R X |
| 3,864,013 | 2/1975 | Levy | 339/272 A |
| 3,951,490 | 4/1976 | Devendorf | 339/122 R X |

FOREIGN PATENTS OR APPLICATIONS 1,229,880  3/1960  France ................. 339/272

Primary Examiner—Roy Lake
Assistant Examiner—Howard N. Goldberg
Attorney, Agent, or Firm—Norman J. O'Malley; Robert E. Walrath; Robert T. Orner

[57] ABSTRACT

An equipment housing for a communication system such as a community antenna television system wherein signals are coupled via a coaxial cable is shown. The coaxial cable can be attached to alternative ports of the equipment housing. A connector with first and second intersecting bores is retained in the housing in a position to receive the center conductor of the coaxial cable through either of the first and second ports. A threaded set-screw inserted in a third bore of the connector secures the center conductor in either of the first and second bores. A third port in the equipment housing provides access to the set-screw.

8 Claims, 4 Drawing Figures

EQUIPMENT HOUSING FOR COMMUNICATION SYSTEM

FIELD OF THE INVENTION

This invention pertains to equipment housings and more particularly to an equipment housing for a communication system wherein signals are coupled via a coaxial cable.

BACKGROUND OF THE INVENTION

In communication systems in which signals are coupled via a coaxial cable, such as community antenna television (CATV) systems, various equipment housings are typically distributed along the cable. For example, the communication signals are attenuated by the coaxial cable and amplifiers are commonly placed at periodic intervals to maintain proper signal levels. Directional couplers, splitters, mulit-taps, and similar passive devices are also interposed at various points in the system to provide signals to various secondary transmission paths. As a more specific example multi-taps are used in CATV systems to provide a plurality of subscriber drops for connection to television receivers in the subscribers' premises. Segments of the coaxial cable must be coupled to each of these various equipment housings.

Typical CATV installations can be either aerial or underground. In aerial installations the coaxial cable and equipment housings are typically suspended from a metal strand. In underground installations the cable is buried underground with the equipment housings ordinarily mounted in pedestals. When aerial strand mounting is used, it is normally desired to provide access ports to the equipment housings on opposite sides so that bending of the coaxial cable is minimized. When pedestal mounting is used in underground or buried installations, access ports on the same side of the equipment housing are normally desired. To accomodate these conflicting requirements, a pair of access points are normally provided at two corners of the equipment housing so that either type of mounting can be accomodated with a single equipment housing. The unused access ports are plugged or capped.

The two commonly used methods of connecting the coaxial cable to the equipment housing include a feed-through connector and a center-seized connector. In the feed-through connector the center conductor of the coaxial cable feeds through the connector and is seized by a connector block within the equipment housing. In the center-seized connector the center conductor of the coaxial cable is seized by the connector and mechanically connected to a pin or probe which inserts into the equipment housing and is connected therein, for example, by a connector block.

While connector blocks capable of receiving the center conductor of the coaxial cable or the substitute connector probe from two right-angle directions are known in the prior art, the technique normally used is to provide two intersecting threaded holes through block at 90°. The conductor to be seized is inserted through one of the holes and a clamping screw or set-screw is threaded into the other of the holes to clamp the conductor in the connector block. It has been found, however, that this type of clamping severely damages the conductor being clamped. The set-screw presses the conductor against the wall of the intersecting hole thereby causing the threads and the hole edge to cut into the conductor. Furthermore, the conductor is pushed into the intersecting hole with additional bending damage. Since the center conductor expands and contracts with temperature changes, the bending and cutting encountered in typical prior art connector blocks create fracture or stress points that later contribute to failure of the center conductor. Since tolerances are typically close, failure of the center conductor may necessitate replacement of a lengthy segment of coaxial cable or an undesired splice in the cable. This form of clamping may also damage any plating on the center conductor or the substitute probe with resultant deleterious effect on the conductor or on the signals carried thereby.

Another prior art technique is to mount the connector block of the same form in the equipment housing directly to a circuit board or card. It has been found that the strain put on the circuit card when the center conductor expands or contracts with temperature changes causes failure of the circuit card. The prior art alternative to mounting on a circuit card generally includes mounting the connector block with hardware to an insulator which is relatively complex and cumbersome.

OBJECTS OF THE INVENTION

Accordingly, it is a primary object of this invention to obviate the above noted and other disadvantages of the prior art.

It is a further object of this invention to provide an equipment housing with a capability of accepting coaxial cable connections from alternative directions.

It is a further object of this invention to provide a connector block for an equipment housing which can accept a center conductor of a coaxial cable from alternative directions without damage thereto.

It is a further object of this invention to provide a connector block for an equipment housing which can accept a central conductor of a coaxial cable from alternative directions without disassembly of the connector block.

It is a further object of this invention to provide a simple and inexpensive mounting of a connector block in an equipment housing.

It is a further object of this invention to provide access to a connector block in an equipment housing without disassembly of the housing.

It is a further object of this invention to provide an equipment housing with a provision for accepting a coaxial cable from alternative directions without deleterious effect on the center conductor or on the signals coupled via the coaxial cable.

SUMMARY OF THE INVENTION

The above and other objects and advantages of this invention are achieved in an equipment housing for a communication system wherein signals are coupled via a coaxial cable. The equipment housing includes first and second ports adapted for alternative attachment to the coaxial cable and a third port. The equipment housing further includes a connector which includes a metallic block with first and second intersecting bores therethrough and a third bore intersecting the first and second bores. The connector further includes a threaded insert or set screw in the third bore for securing a wire in either of said first and second bores and a terminal for making connection to electrical circuitry in the equipment housing. The equipment housing further includes a retaining means for retaining the connector in the equipment housing with the first, second, and third bores aligned with with the first, second, and third ports respectively. The first and second bores alternatively receive a signal carrying conductor associated with the coaxial cable and the third port provides access to the threaded insert for securing and releasing the conductor.

DRIEF DESCRIPTION OF THE DRAWINGS

DETAILED DESCRIPTION OF THE PREFERRED EMBODIMENT

Figure 1:
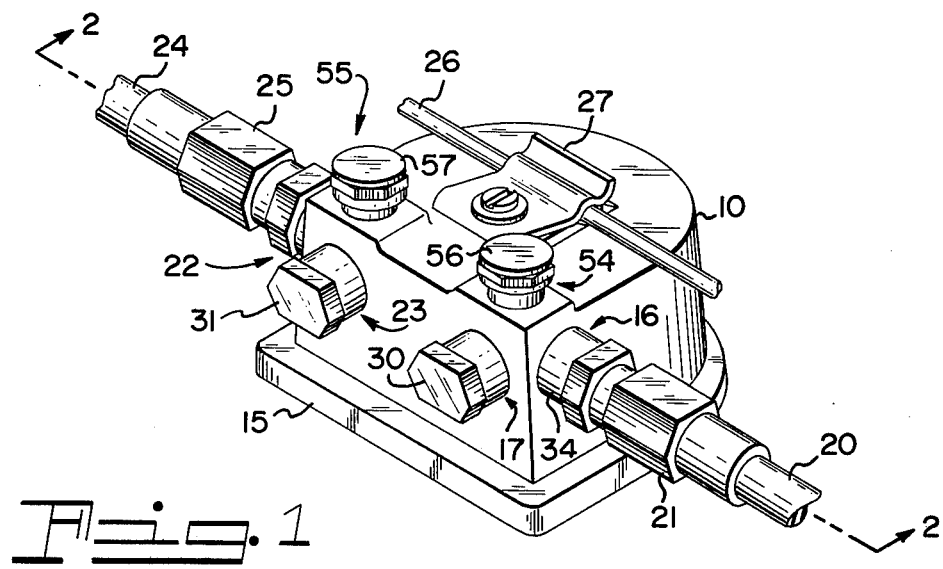
FIG. 1 is an isometric view of a multi-tap housing suspended from a strand with first and second coaxial cables connected thereto.

For a better understanding of the present invention, together with other and further objects, advantages, and capabilities thereof, reference is made to the following disclosure in conjunction with the accompanying drawing. While a multi-tap of the type utilized in CATV systems is illustrated in the preferred embodiment, those skilled in the art will realize that the invention defined by the appended claims is not limited to multi-taps or to CATV systems.

The equipment housing illustrated in the drawings includes a base or housing 10 and a cover 11 secured thereto by a suitable fastening means illustrated as a screw 12 threaded into a centrally located post 13 in housing 10. An O-ring 14 provides a weatherproof seal between cover 11 and housing 10. In the preferred form of aerial mounting, cover 11 is oriented downwardly so that flange 15 on housing 10 provides additional weather protection.

First and second ports 16 and 17, which can be the input ports, are located adjacent one corner of housing 10 for alternative attachment to a coaxial cable 20 by a suitable connector 21. First and second ports 22 and 23, which can be the output ports, are located adjacent another corner of housing 10 for alternative attachment to a coaxial cable 24 by a suitable connector 25. As was indicated above, ports 16 and 22 are used in the preferred arrangement for aerial systems wherein housing 10 is attached to a suitable strand 26 by a bracket 27. Alternative ports 17 and 23 are not used in the illustrated arrangement and are closed by suitable plugs 30 and 31. When housing 10 is mounted on a pedestal, as is used in underground installations, coaxial cables 20 and 24 will normally be attached to ports 17 and 23 while plugs 30 and 31 will be threaded into ports 16 and 22.

Cover 11 carries a plurality of taps 32 with the number of taps being variable depending upon subscriber density and other factors. Since the number of taps may vary and the electrical circuitry will vary depending upon the number of taps, taps 32 and circuit board or card 33 are mounted on cover 11 so that only cover 11 need be changed to vary the number of taps. Card 33 can be mounted, for example, on suitable posts 29 formed integrably with cover 11. The electrical circuitry on card 33 is not shown in detail since the specific circuit arrangement can be any suitable known circuit and may vary between different installations. Taps 32 are illustrated unconnected but they are typically connected to subscriber drops in practice with unused taps covered by weather covers.

Port 16 is illustrated as including a flange 34 which is threaded to receive connector 21 or the alternative plug 30. Connector 21 or plug 30 butt against the end of flange 34. An O-ring 28 is interposed between connector 21 and flange 34 to provide a weather-proof seal. In many installations it is desired to provide additional weather-proofing in the form of a heat-shrunk plastic sleeve which covers flange 34 and connector 21. Lip 35 facilitates retention of the heat-shrunk plastic sleeve. Ports 17, 22, and 23 are substantially identical to port 16 and will not be described in detail.

Figure 2:
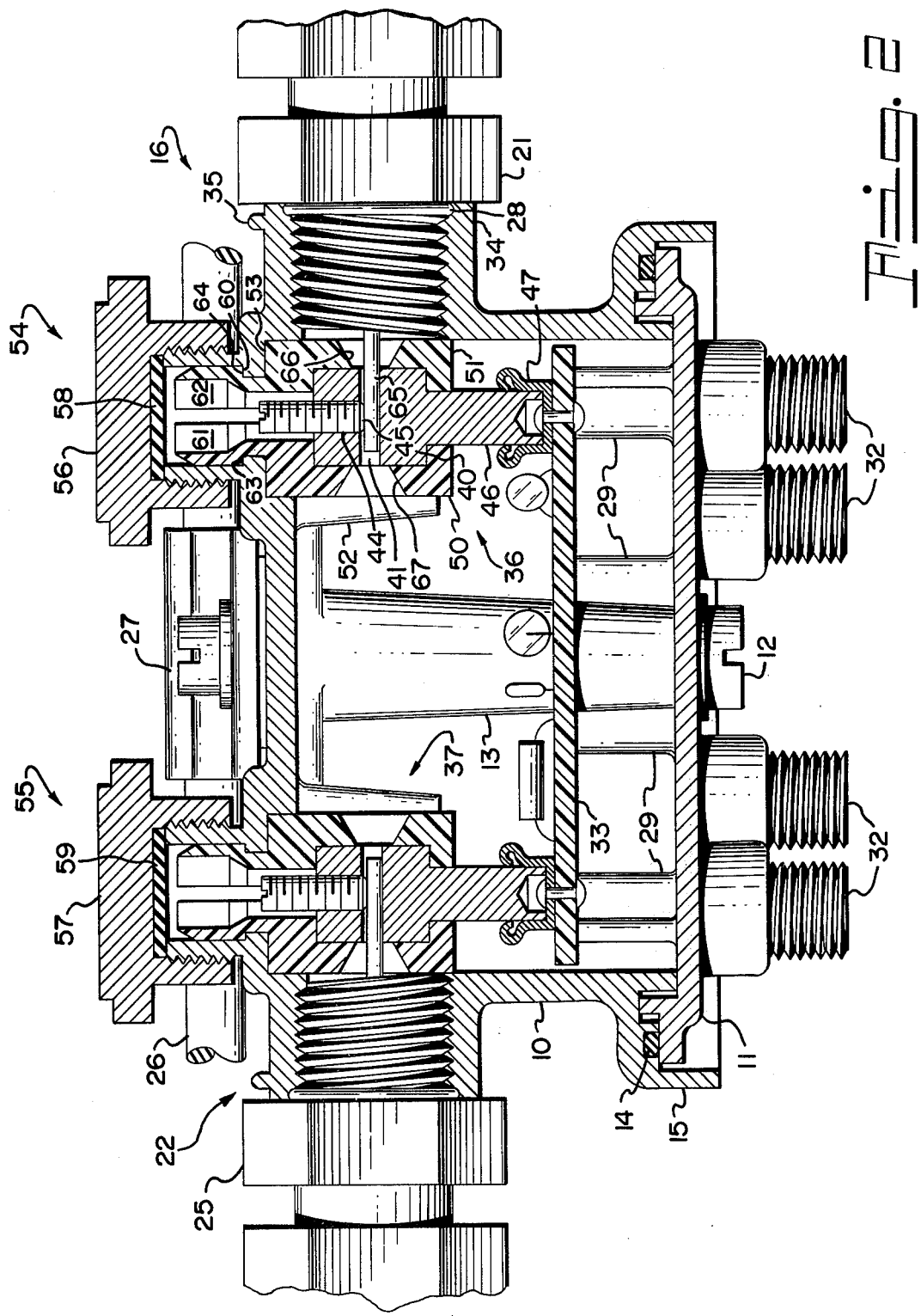
FIG. 2 is a sectional view of the multi-tap housing taken along line 2—2 of FIG. 1.

A connector and retaining means assembly 36 is positioned adjacent ports 16 and 17. Assembly 36 is illustrated in detail in FIG. 4, as assembled in housing 10 in FIG. 3, and in section in FIG. 2. A similar connector and retaining means assembly 37 is positioned adjacent ports 22 and 23. The connector in assembly 36 includes a metallic block 40 which has first and second bores or holes 41 and 42 therethrough. A third bore 43 is threaded to receive a threaded insert 44. Preferably bores 41, 42, and 43 intersect at right angles so that insert or set-screw 44 can secure a wire in either of bores 41 or 42. Bores 41 and 42 are preferably of the same diameter and tangent to the same plane so that the surfaces opposite bore 43 are smooth. Accordingly, when a wire is inserted in either of bores 41 and 42, damage to the wire is minimized when it is clamped by set-screw 44. In this regard, the clamping surface 45 of set-screw 44 is preferably flattened or includes a flat portion so that it does not cut or otherwise damage the wire being clamped. The clamping surface 45 is preferably deburred with all sharp edges removed to further minimize damage to the wire. Of particular advantage, the wire to be clamped can be inserted through either port 16 or 17 and clamped without disassembly and reassembly of hardware. Furthermore, the coaxial cable can be changed from port 16 to port 17, if desired, with minimum complexity.

The connector of assembly 36 further includes a terminal or post 46 for making connection to the electrical circuitry on circuit card 33. A particular advantageous form of connection is illustrated wherein post 46 is frictionally inserted into a clip 47 carried by circuit card 33. Accordingly, cover 11 can be easily removed and replaced with minimum effort.

Figure 3:
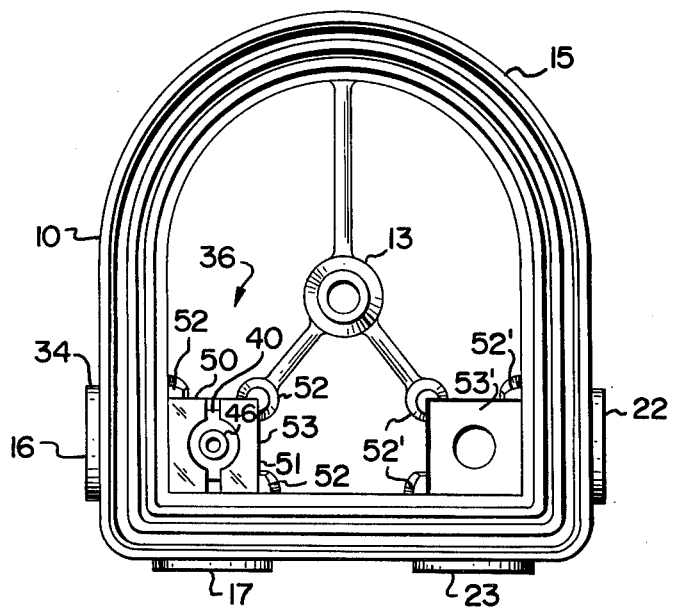
FIG. 3 is a plan view of the multi-tap housing with the cover, the circuitry, and one connector removed.
Figure 4:
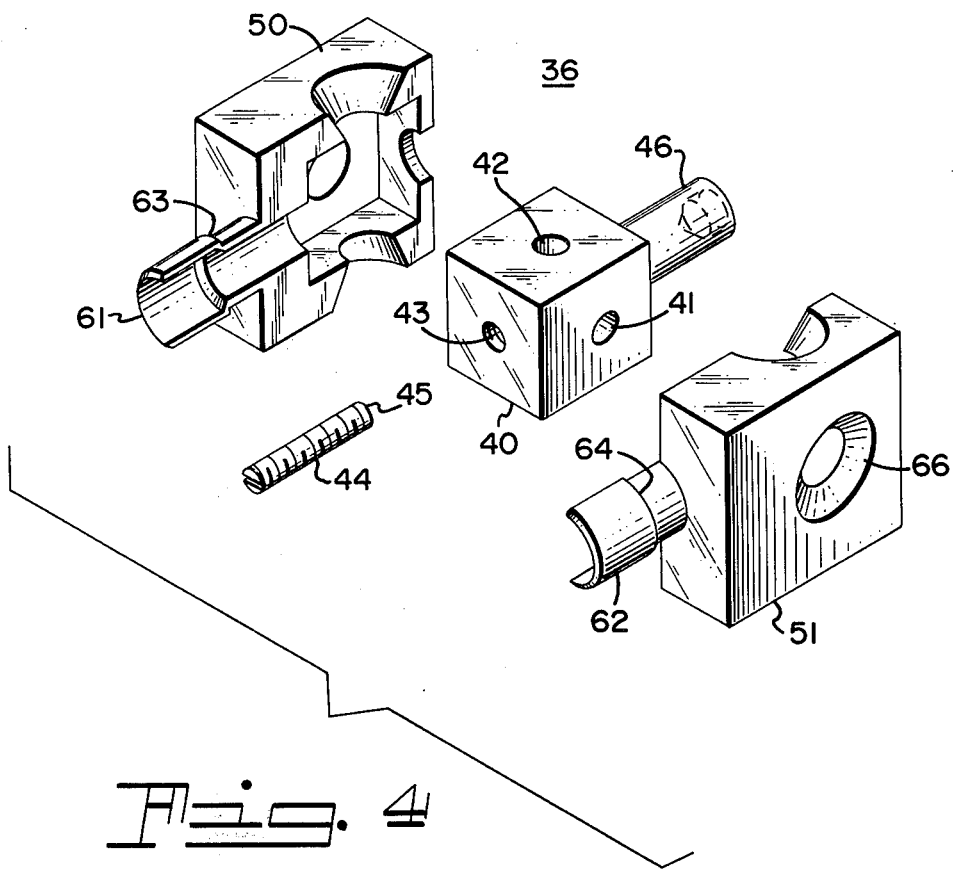
FIG. 4 is an isometric view of a connector and retaining means in accordance with the invention.

The retaining means of assembly 36 includes first and second insulative or plastic members 50 and 51 which engage the periphery of metallic block 40. While separate members 50 and 51 are illustrated, those skilled in the art will realize that block 40 could be molded into a single insulative member as well. Members 50 and 51 together with block 40 slidably engage cooperating posts 52 in housing 10. Members 50 and 51 enter a recess 53 in housing 10. Recess 53 together with posts 52 and the walls of housing 10 prevent lateral movement of assembly 36. FIG. 3, wherein assembly 37 has been removed, further illustrates the detail of posts 52' and recess 53' associated with assembly 37 equivalvent to posts 52 and recess 53.

Housing 10 has a third port 54 associated with assembly 36 and ports 16 and 17 which provides access to set-screw 44 without disassembly of housing 10 or removal of cover 11. A port 55 similar to port 54 is associated with assembly 37 and ports 22 and 23. Removable weather covers 56 and 57 close ports 54 and 55, respectively, when not in use. Gaskets 58 and 59 in covers 56 and 57, respectively, provide environmental or weather seals.

Access port 54 includes a shoulder 60 therein. Members 50 and 51 include cooperating extensions 61 and 62, respectively, which have shoulders 63 and 64, respectively, for latchably engaging shoulder 60 in access port 54 when assembly 36 is placed in position. Accordingly, assembly 36 is easily installed by assembling the parts and then merely sliding the assembly between posts 52 into recess 53 and snapping extensions 61 and 62 into port 54 at shoulder 60. Shoulders 60, 63, and 64 together with posts 52 and recess 53 and insulative members 50 and 51 fixedly retain metallic block 40 in housing 10 with bores 41, 42, and 43 aligned with ports 16, 17, and 54, respectively. Extensions 61 and 62 extend into port 54 to provide insulative protection for the tool used to loosen or tighten set-screw 44 to protect against shorting center conductor 65 to housing 10 when set-screw 44 is accessed while the cable is carrying signals.

In installations where a feed-through connector 21 is used, a center conductor 65 of coaxial cable 20 feeds through into bore 41 where it is seized by set-screw 44 and fixedly retained therein with minimal damage to the center conductor. When the alternative port 17 is used, the center conductor of the coaxial cable is inserted into bore 42 where it is similarly retained. Where center-seized connectors are used, the substitute probe or wire is inserted into the corresponding bore in block 40 and seized in a similar manner. Member 51 has a beveled opening 66 to facilitate guiding center conductor 65 into bore 41. A similar beveled opening 67 is provided in member 50 as well as beveled openings about bore 42 so that members 50 and 51 are interchangeable and the orientation of assembly 36 is flexible.

Accordingly, there has been illustrated and described an equipment housing with a novel arrangement of ports and connector blocks with novel retaining means for retaining the connector blocks in fixed relationship with the ports. The retaining means and connector block is easily assembled and connections therein are readily made without disassembly and reassembly. Furthermore, flexibility is provided for various types of installations with minimal changes to the structure.

While there has been shown and described what is at present considered the preferred embodiment of the invention it will be obvious to those skilled in the art that various changes and modifications may be made therein without departing from the scope of the invention as defined by the appended claims.

We claim:

1. An equipment housing for a communication system wherein signals are coupled via a coaxial cable comprising:
   first and second ports adapted for alternative attachment to said coaxial cable and a third port having a shoulder therein;
   a connector including a metallic block with first and second intersecting bores therethrough and a third bore intersecting said first and second bores, a threaded insert in said third bore for securing a wire in either of said first and second bores, and a terminal for making connection to electrical circuitry in said equipment housing; and
   retaining means for retaining said connector in said equipment housing with said first, second, and third bores aligned with said first, second, and third ports, respectively, said retaining means having a cooperating extension for insertion into said third port and a shoulder for latchably engaging said shoulder in said third port, said first and second bores for alternatively receiving a signal carrying conductor associated with said coaxial cable, and said third port providing access to said threaded insert for securing and releasing said conductor.

2. An equipment housing as defined in claim 1 wherein said third bore terminates at the intersection with said first and second bores.

3. An equipment housing as defined in claim 2 wherein said first and second bores are tangent to the same plane.

4. An equipment housing as defined in claim 1 wherein said retaining means includes first and second insulative members for engaging the periphery of said metallic block and cooperating posts in said housing for slidably engaging said insulative members, each of said insulative members including a cooperating extension for insertion into said third port and a shoulder for latchably engaging said shoulder in said third port.

5. An equipment housing for a communication system wherein signals are coupled via a coaxial cable comprising:
   first and second ports adapted for alternative attachment to said coaxial cable and a third port including a shoulder therein;
   a connector including a metallic block with first and second orthogonally intersecting bores therethrough and a third bore orthogonally intersecting each of said first and second bores, a threaded insert in said third bore for securing a wire inserted in either of said first and second bores, and a terminal post for making connection to electrical circuitry in said equipment housing; and
   retaining means for retaining said connector in said equipment housing with said first, second, and third bores aligned with said first, second, and third ports, respectively, said retaining means including an extension for insertion into said third port and a shoulder for latchably engaging said shoulder in said third port, said first and second bores for alternatively receiving the center conductor of said coaxial cable, and said third port providing access to said threaded insert for securing and releasing said center conductor of the coaxial cable.

6. An equipment housing as defined in claim 6 wherein said first and second bores are tangent to the same plane.

7. An equipment housing as defined in claim 6 wherein said third bore terminates at the intersection with said first and second bores.

8. An equipment housing as defined in claim 5 wherein retaining means includes first and second insulative members for engaging the periphery of said metallic block and cooperating posts in said housing for slidably engaging said insulative members, each of said insulative members including an extension for insertion into said third port and a shoulder for latchably engaging said shoulder in said third port.

* * * * *